E. T. MAHAN.
SOLDERING IRON.
APPLICATION FILED JULY 11, 1919.

1,334,254.

Patented Mar. 16, 1920.

WITNESSES

INVENTOR
EDGAR T. MAHAN
BY
ATTORNEYS

UNITED STATES PATENT OFFICE.

EDGAR TAYLOR MAHAN, OF ARDMORE, PENNSYLVANIA.

SOLDERING-IRON.

1,334,254.

Specification of Letters Patent. Patented Mar. 16, 1920.

Application filed July 11, 1919. Serial No. 310,173.

*To all whom it may concern:*

Be it known that I, EDGAR TAYLOR MAHAN, a citizen of the United States, and a resident of Ardmore, in the county of Montgomery of Pennsylvania, have invented a new and Improved Soldering-Iron, of which the following is a full, clear, and exact description.

This invention relates to improvements in soldering irons, an object of the invention being to provide a soldering iron having a combustion chamber in which gas and air of any desired pressure, either high or low, can be burned to efficiently heat the iron.

A further object is to provide an improved construction which can be readily assembled or taken apart and which most efficiently performs the functions for which it is intended.

With these and other objects in view the invention consists in certain novel features of construction, and combinations and arrangements of parts, as will be more fully hereinafter described and pointed out in the claim.

In the accompanying drawings—

Figure 1:
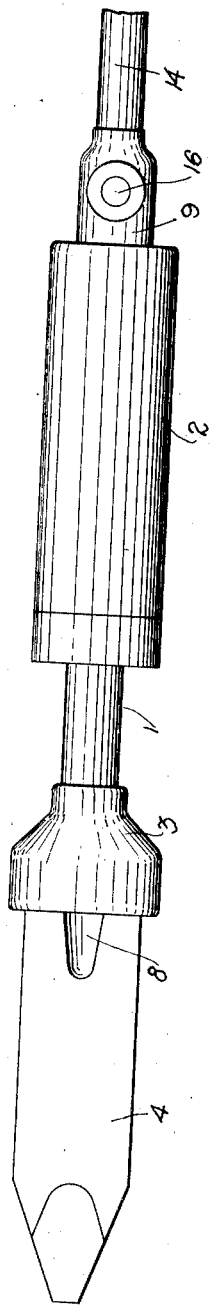
Figure 2:
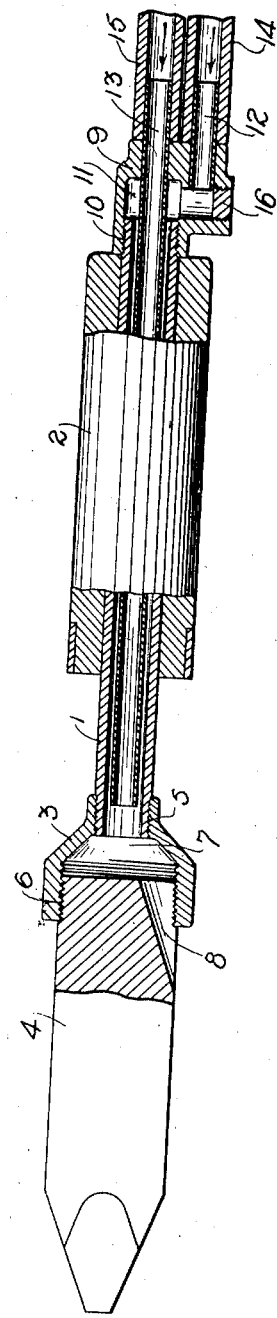

Figure 1 is a view in side elevation illustrating my improved soldering iron; and Fig. 2 is a view in longitudinal section partly in elevation.

1 represents a tubular handle having a hand hold 2 of wood or other suitable material thereon, and connected at one end by a coupling 3 with the iron 4, the latter being preferably of the copper point type. The coupling 3 is secured on the end of the tubular handle 1 by screw threads 5, and the iron 4 has screw-threaded engagement, as shown at 6, with said coupling.

The coupling 3 provides a combustion chamber 7 at the inner end of the iron 4, and the latter is made with any number of flutes or recesses 8 constituting burner orifices for the combustion chamber 7.

A coupling 9 has screw-threaded engagement, illustrated at 10, with the rear end of tubular handle 1, and this coupling 9 is provided with a transversely extending chamber 11, which is preferably machined into the coupling and has its outer end closed by a plug 16.

A relatively short air inlet pipe 12 communicates with the chamber 11 and extends beyond the coupling 9 operating as a nipple for the attachment of an air supply hose 14. A gas pipe 13 extends across the chamber 11 and terminates at its inner end at a point slightly removed from the combustion chamber 7 so as to discharge the gas into the air in the tubular handle 1 permitting a thorough intermingling of the air and gas as it enters the combustion chamber. The rear end of the gas pipe 13 extends through the coupling 9 and constitutes a nipple for the attachment of a gas supply hose 15.

In operation the air is supplied to the chamber 11 by the pipe 12 and flows along the tubular handle 1 outside of the gas pipe 13 until it reaches the end of the pipe 13 where it mixes with the gas, the latter being supplied through pipe 13, as above explained.

While I have illustrated what I believe to be a preferred embodiment of my invention, I would have it understood that the invention is not limited to the precise details set forth as I consider myself at liberty to make such changes and alterations as fairly fall within the spirit and scope of the appended claim.

I claim:

A device of the character described, comprising a tubular handle, an iron, a coupling connecting the handle and the iron and forming a combustion chamber between them, said iron having recesses therein forming burner orifices, a hand hold on the tubular handle, a coupling on the rear end of the handle having a transversely extending air chamber therein, a pair of parallel pipes, one pipe relatively long extending through the coupling of the air chamber therein and into the tubular handle and terminating at a point adjacent the first mentioned coupling, and the other of said pipes relatively short and communicating with the air chamber to one side of the first-mentioned pipe, the outer ends of both of said pipes constituting hose receiving nipples.

EDGAR TAYLOR MAHAN.